US007002315B2

(12) United States Patent
Aono et al.

(10) Patent No.: US 7,002,315 B2
(45) Date of Patent: Feb. 21, 2006

(54) SERVO CONTROL DEVICE

(75) Inventors: Ryuji Aono, Numazu (JP); Naomi Kobayashi, Numazu (JP); Takeshi Iida, Numazu (JP); Takamichi Ito, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/438,983

(22) Filed: May 16, 2003

(65) Prior Publication Data

US 2003/0222615 A1    Dec. 4, 2003

(30) Foreign Application Priority Data

May 28, 2002  (JP) ............................. 2002-154202
May 31, 2002  (JP) ............................. 2002-160035

(51) Int. Cl.
G05B 11/32    (2006.01)

(52) U.S. Cl. ...................... 318/625; 318/560; 318/563; 318/567; 318/568; 318/600

(58) Field of Classification Search ............... 318/560, 318/563, 567, 568, 600–625, 700–800
See application file for complete search history.

(56) References Cited

U.S. PATENT DOCUMENTS

| | | | |
|---|---|---|---|
| 4,106,100 A | | 8/1978 | Okada et al. |
| 4,573,002 A | * | 2/1986 | Kurakake et al. ........... 318/721 |
| 4,715,548 A | | 12/1987 | Miyake et al. |
| 5,038,090 A | * | 8/1991 | Kawabata et al. .......... 318/721 |
| 5,451,846 A | | 9/1995 | Peterson et al. |
| 5,568,034 A | * | 10/1996 | Huggett et al. ............. 318/802 |
| 5,870,591 A | | 2/1999 | Sawada |
| 6,025,684 A | * | 2/2000 | Yasui ......................... 318/434 |
| 6,188,194 B1 | * | 2/2001 | Watanabe et al. ........... 318/625 |
| 6,255,798 B1 | | 7/2001 | Obara et al. |
| 6,445,154 B1 | * | 9/2002 | Toyozawa et al. .......... 318/700 |

FOREIGN PATENT DOCUMENTS

| | | |
|---|---|---|
| EP | 0 419 656 A1 | 4/1991 |
| EP | 3-285589 | 4/1991 |
| EP | 0 909 016 A3 | 4/1999 |
| JP | 4-304504 | 10/1992 |
| JP | 07-194171 | 7/1995 |
| JP | 2004-005218 * | 1/2004 |
| KR | 2000-0024938 A | 5/2000 |

OTHER PUBLICATIONS

Search Report under Section 17, dated Feb. 20, 2004 for British Application No. 0312084.7.

* cited by examiner

*Primary Examiner*—Marion T. Fletcher
*Assistant Examiner*—Tyrone Smith
(74) *Attorney, Agent, or Firm*—Pillsbury Winthrop Shaw Pittman LLP

(57) ABSTRACT

A servo control device comprises a current supply unit for supplying a drive unit with a drive current for driving a target to be controlled, a first detector for detecting at least the drive current value, and a logical arithmetic section. The logical arithmetic section introduces a current command determining the drive current for controlling the drive speed of the drive unit to move the target to a predetermined position, and introduces the drive current value fed back from the first detector. The logical arithmetic section outputs the current command to the current supply unit after converting the current command by a digital logic process on the basis of the drive current value by using a custom LSI.

4 Claims, 6 Drawing Sheets

SERVO CONTROL DEVICE

CROSS-REFERENCE TO RELATED APPLICATIONS

This application is based upon and claims the benefit of priority from the prior Japanese Patent Applications No. 2002-154202, filed on May 28, 2002, and No. 2002-160035, filed on May 31, 2002, the entire contents of which are incorporated herein by reference.

BACKGROUND OF THE INVENTION

1. Field of the Invention

This invention relates to a servo control device.

2. Description of Related Art

As examples of servo motor control method, (1) position control, (2) speed control, and (3) current control are known.

Position control is a method in which a speed command is generated based on a difference between a positioning command and a positional feedback such that a target to be controlled can be moved to or maintained at an intended position.

Speed control is a method in which a current (torque) command is generated based on a difference between a speed command and a speed feedback such that the speed of a target to be controlled can be controlled at an intended value.

Current control is for controlling a current driver in accordance with a difference between a current command and a current feedback such that the current value of a target to be controlled can be controlled at an intended value. In a servo motor, the current driver corresponds to an inverter device typically controlled by PWM (pulse width modulation). In a synchronous motor, an electrical angle, which is used for arithmetical operation of the position of the magnetic poles of the motor, is necessary for the current control.

Heretofore, the aforementioned three ways of control have been realized by software (algorithm) executed on CPU.

FIG. 4 is a schematic block diagram shown to explain an existing technique for current control of a synchronous motor. As shown in FIG. 4, when current commands (U-phase current command and W-phase current command) are given to a CPU from outside, CPU 51 calculates a command value to be given to a PWM inverter 52 according to an algorithm realized by software beforehand such that the difference between the current command and the current value of a motor 61 detected from current detectors 62a, 62b becomes zero. According to the command value sent from CPU 51, the PWM inverter 52 supplies the motor 61 with an electric power for rotating it.

Speed control and position control can be realized in substantially the same manner as the current control shown in FIG. 4. When speed control is realized, both of the current control and the speed control are implemented. When position control is realized, all of the current control, the speed control and the position control are implemented.

FIG. 7 is a block diagram schematically showing an existing combination of a servo control device 100 and a servo motor 200. In general, a servo control device for controlling a plurality of servo motors controls individual axes of the servo motors in each clock period. The servo control device includes current drivers for driving the servo motors and control arithmetical units for controlling the current drivers. To enable the servo control device to control individual axes of the servo motors, the current drivers and the control arithmetical units are respectively associated with individual axes of the servo motors.

The servo control device 100 shown in FIG. 7 includes a position controller 110, speed controller 120, control arithmetical units 130, current drivers 150, current detectors 170, current feedback circuits 190, position detectors 210, and position feedback circuits 220. The control arithmetical units 130, current drivers 150, current detectors 170, and current feedback circuits 190 are respectively associated with the individual axes of the servo motors 200. Each servo motor 200 has its own position detector 210.

The position controller 110 generates a speed command based on a position command. The speed controller 120 generates a current command based on the speed command from the position controller 110.

Each control arithmetical unit 130 controls the associated current driver 150 in accordance with the current command from the position controller 110, and each current driver 150 supplies a current to the associated servo motor 200. The servo motor 200 is driven by this current.

Each position detector 210 detects the position of the associated servo motor 200, and the position feedback circuit 220 sends the detected position of the servo motor 200 back to the position controller 110 as feedback information.

The current supplied to each servo motor 200 is detected by the associated current detector 170. The current value detected by the current detector 170 is returned to the control arithmetical unit 130 by the current feedback circuit 190.

The control arithmetical unit 130 compares the current value returned from the current detector 170 with the current value specified by the current command and calculates a corrected current to be supplied to the servo motor 200.

For control of each servo motor, control periods (time) for (1) position control, (2) speed control and (3) current control must satisfy the relation of (1)>(2)>(3) because the torque (current) must be controlled with a response time faster than that of the speed in order to control the speed, and the position must be controlled with a response time faster than that of the speed in order to control the position.

The control period of (1) concerns the positional accuracy, and the shorter the control period the higher the performance realized. The main current of the position control period for typical servo control devices ranges from several hundred $\mu$sec to several msec.

On the other hand, CPU 51 in charge of current control explained in conjunction with FIG. 4 must carry out procedures as many as several hundred steps to several thousand steps for execution of the control in order to sequentially manage its arithmetical operations for the control. Therefore, it usually takes tens of $\mu$sec or more in turnaround time from inputting the command value until outputting a resultant value.

It is known that reduction of the turnaround time contributes to reduction of the so-called useless time in the control theory and makes it possible to set up a higher gain in the control loop and thereby improve the controllability. That is, the shorter the turnaround time a controller has, the higher its control capability may be.

The turnaround time depends upon the processing speed of the CPU. However, CPUs having high processing speeds are expensive. Therefore, the control period of (3) is already near the limit of the performance of typical CPUs currently available, taking the relation of (1)>(2)>(3) into consideration.

Therefore, it was difficult to attain both an improvement of the control performance and a reduction of the cost with conventional servo control devices.

In the servo control device 100 shown in FIG. 7, current control relied upon arithmetical processing of a program, the software, by each control arithmetical unit 130, the hardware. That is, in the conventional technique, the control arithmetical unit 130 was a program-controlled type device. Therefore, the servo control device 100 involved the same problem.

Further, since the servo control device 100 shown in FIG. 7 uses a plurality of control arithmetical units 130 individually associated with the respective servo motors 200, it needs the same number of CPUs, and hence involved the additional problem that its cost and size increase a lot.

It is therefore desired to provide a servo control device reduced in manufacturing cost, compact and shorter in control period of the target of the control than a conventional one, and thereby capable of attaining both an improvement of the control capability and reduction of the cost.

SUMMARY OF THE INVENTION

According to an embodiment of the invention, there is provided a servo control device connected to servo motors to control the servo motors, comprising: a digital logic circuit having a predetermined bit width, and including at least one pair of parallel arithmetic circuits.

In this control device, the digital logic circuit as a dedicated hardware circuit executes the control in lieu of a CPU using software to execute the control. Although the digital logic circuit has the disadvantage of being poor in versatility and difficult to change in its specification, its data processing capability can be several dozen times the capability of CPU under an equal clock frequency. Therefore, the device can accomplish high-speed current calculation and can be remarkably improved in control capability.

Additionally, the digital logic circuit can be manufactured at a lower cost than the cost to use a high-performance CPU.

Furthermore, while the bit width of a single event of calculation by CPU is determined by the length of the register contained in CPU, the bit width of the digital logic circuit can be determined freely. Therefore, any bit width optimum for the contents of a particular control can be selected, thereby to prevent redundancy in design and improve the control efficiency.

Additionally, since the digital logic circuit includes at least one pair of the parallel arithmetical circuits, the time for calculation can be shortened.

Preferably, the servo control device may include a PWM inverter, and the digital logic circuit may generate PWM for controlling the PWM inverter.

According to another embodiment of the invention, there is provided a servo control device comprising: a current supply unit for supplying a drive unit with a drive current for driving a target to be controlled; at least a first detector for detecting the drive current value; and a logical arithmetic section which introduces a current command determining the drive current for controlling the drive speed of the drive unit to move the target to be controlled to a predetermined position, introduces the drive current value fed back from the first detector, and outputs the current command to the current supply unit after correcting the current command by a digital logic process on the basis of the drive current value.

DETAILED DESCRIPTION OF A PREFERRED EMBODIMENT OF THE INVENTION

Some embodiments of the invention will now be explained below with reference to the drawings.

Figure 1:
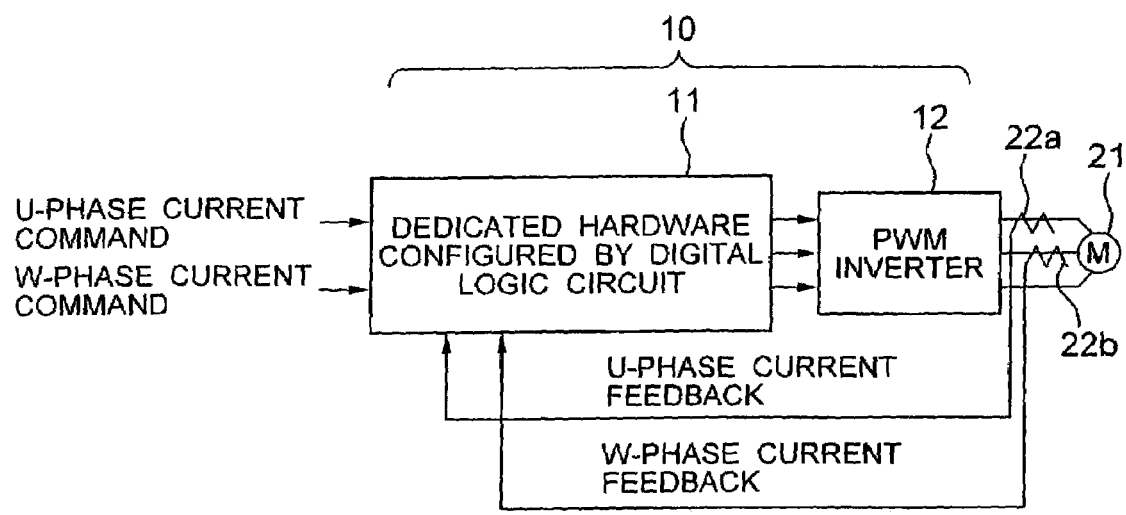
FIG. 1 is a schematic block diagram showing a servo control device according to an embodiment of the invention.

FIG. 1 is a schematic block diagram showing a servo control device 10 according to an embodiment of the invention. As shown in FIG. 1, the servo control device 10 is connected to a synchronous motor 21 to control the current thereof. In association with the synchronous motor 21, current detectors 22a, 22b are connected to detect the current of the motor 21.

The servo control device 10 includes a digital logic circuit 11 supplied with external current commands (U-phase current command and W-phase current command), and a PWM inverter 12 that supplies the synchronous motor 21 with a power for rotating it on the basis of the command value output from the digital logic circuit 11.

The digital logic circuit 11 is configured to output to the PWM inverter 12 a command value reducing to zero the difference between current command (command value) and a current value (feedback value) of the synchronous motor 21 detected from the current detectors 22a, 22b according to an algorithm previously realized as the configuration of the logic circuit (arrangement of the logical arithmetic unit).

Figure 2:
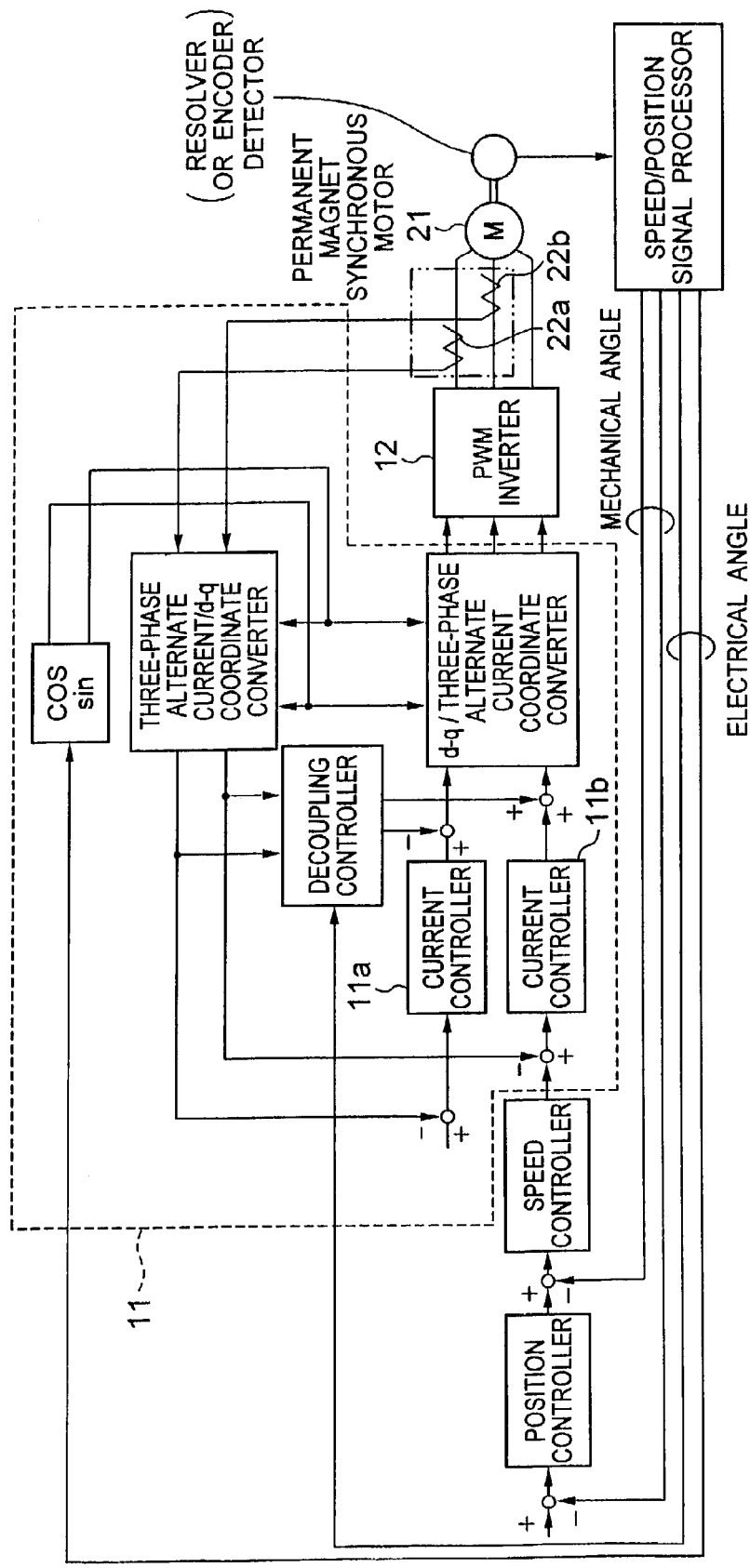
FIG. 2 is a schematic block diagram for explaining a current loop control realized by a digital logic circuit shown in FIG. 1.

FIG. 2 is a schematic block diagram for explaining a current loop control realized by a digital logic circuit 11 according to the instant embodiment. As shown in FIG. 2, the digital logic circuit 11 according to this embodiment includes a pair of current controllers 11a, 1b that are parallel arithmetic circuits.

In this embodiment, the current feedback signal is used in a digital form converted by an A/D converter (not shown) of 12-bit resolution. Responsively, the digital logic circuit 11 is designed and manufactured to have the bit width of 12 bits.

The digital logic circuit 11 can be typically realized in form of an LSI (large-scale integrated circuit). The digital logic circuit 11 can be manufactured more economically than using a high-performance CPU.

Next explained is the function of the servo control device 10 according to the instant embodiment.

External current commands (U-phase current command and W-phase current command) are first applied to the digital logic circuit. On the other hand, the current value (current feedback value) of the synchronous motor 21 is applied to the digital logic circuit 11 from the current detectors 22a, 22b via the A/D converter (not shown).

Then the digital logic circuit 11 outputs to the PWM inverter 12 a command value, which command value reduces to zero the difference between the current command and the current value of the synchronous motor 21 detected from the current detectors 22a, 22b, according to the algorithm previously realized as the configuration of the logic circuit (arrangement of the logical arithmetic unit).

The PWM inverter 12 supplies the synchronous motor 21 with a power for rotating it on the basis of the command value output from the digital logic circuit 11.

Since the digital logic circuit 11 includes the parallel arithmetic circuits, its control time can be reduced as compared with sequential arithmetic operations by CPU. An example of reduction of the control time by the parallel arithmetic circuits is explained with reference to FIG. 3.

Figure 3:
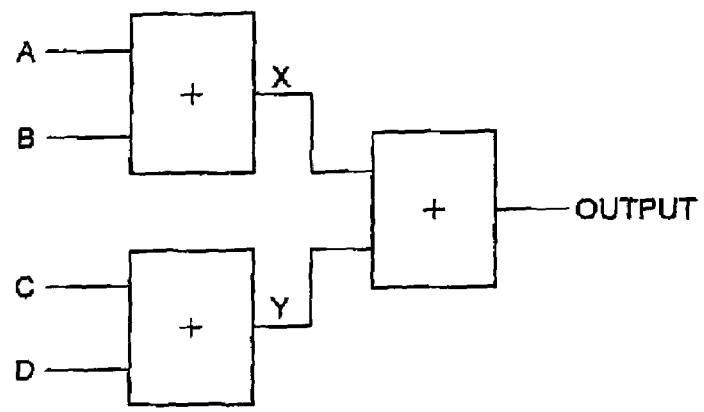
FIG. 3 is a diagram showing an example of reduction of the control time by parallel arithmetical circuits.
Figure 4:
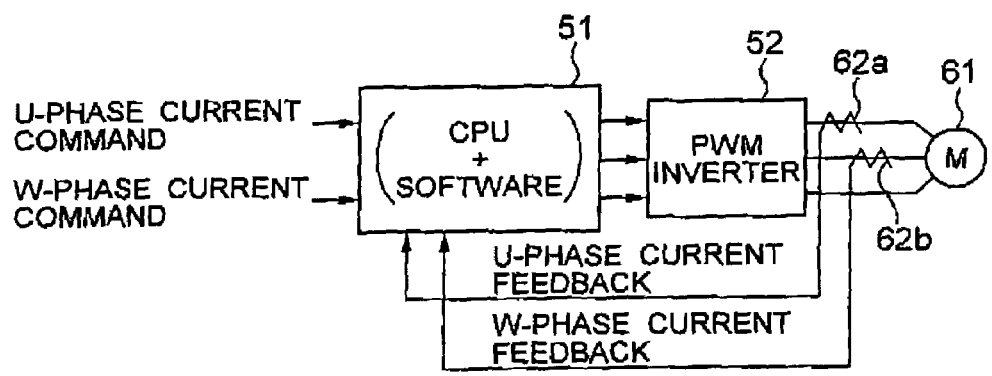
FIG. 4 is a schematic block diagram showing a conventional servo control device.

The digital logic circuit shown in FIG. 3 is configured to execute calculation of (A+B)+(C+D). It proceeds with the calculation of (A+B) and calculation of (C+D) in parallel to complete its entire calculation in two steps. In contrast, sequential arithmetic operations by CPU needs three steps of (1) A+B→X, (2) C+D→Y and (3) X+Y→output. That is, the number of steps of control arithmetic operations by the digital logic circuit 11 having the parallel arithmetic circuits can be significantly reduced from the number of steps of sequential control arithmetic operations by CPU.

Actual control processing time of the digital logic circuit 11 is reduced to several $\mu$sec from that by CPU, which was several tens of $\mu$sec at minimum. That is, the turnaround time is reduced, and the control capability is enhanced.

The digital logic circuit 11 according to the instant embodiment, which is originally manufactured with the 12-bit width in accordance with the A/D converter of the 12-bit resolution, has no redundancy in the arithmetic circuits. Since the register length of a CPU is usually a multiple of 8 bits, it must deal with data after conversion in 16 bits in order to accord with the A/D converter of 12-bit resolution. The device according to the embodiment, however, can eliminate such redundancy and can select data accuracy as desired. Additionally, the digital logic circuit 11 according to the embodiment can prevent the problem of so-called overflow more reliably as well.

The foregoing explanation has been made on current loop control. However, the embodiment is applicable to speed loop control, position loop control, etc.

As explained above, according to this embodiment, higher-speed control arithmetic operation, especially current arithmetic operation, can be realized inexpensively by using the digital logic circuit as a relatively inexpensive dedicated hardware circuit to execute the control in lieu of CPU for executing the control by using software.

Moreover, according to the embodiment, since the digital clock circuit is available for determination of any desired bit width, any bit width optimum for the desired control can be selected to eliminate redundancy in design and to enhance the control efficiency.

Moreover, in case the digital logic circuit has at least one pair of parallel arithmetic circuits, the time for arithmetic operation can be reduced more.

Next explained is a multi-axial servo control device according to another embodiment of the invention.

Figure 5:
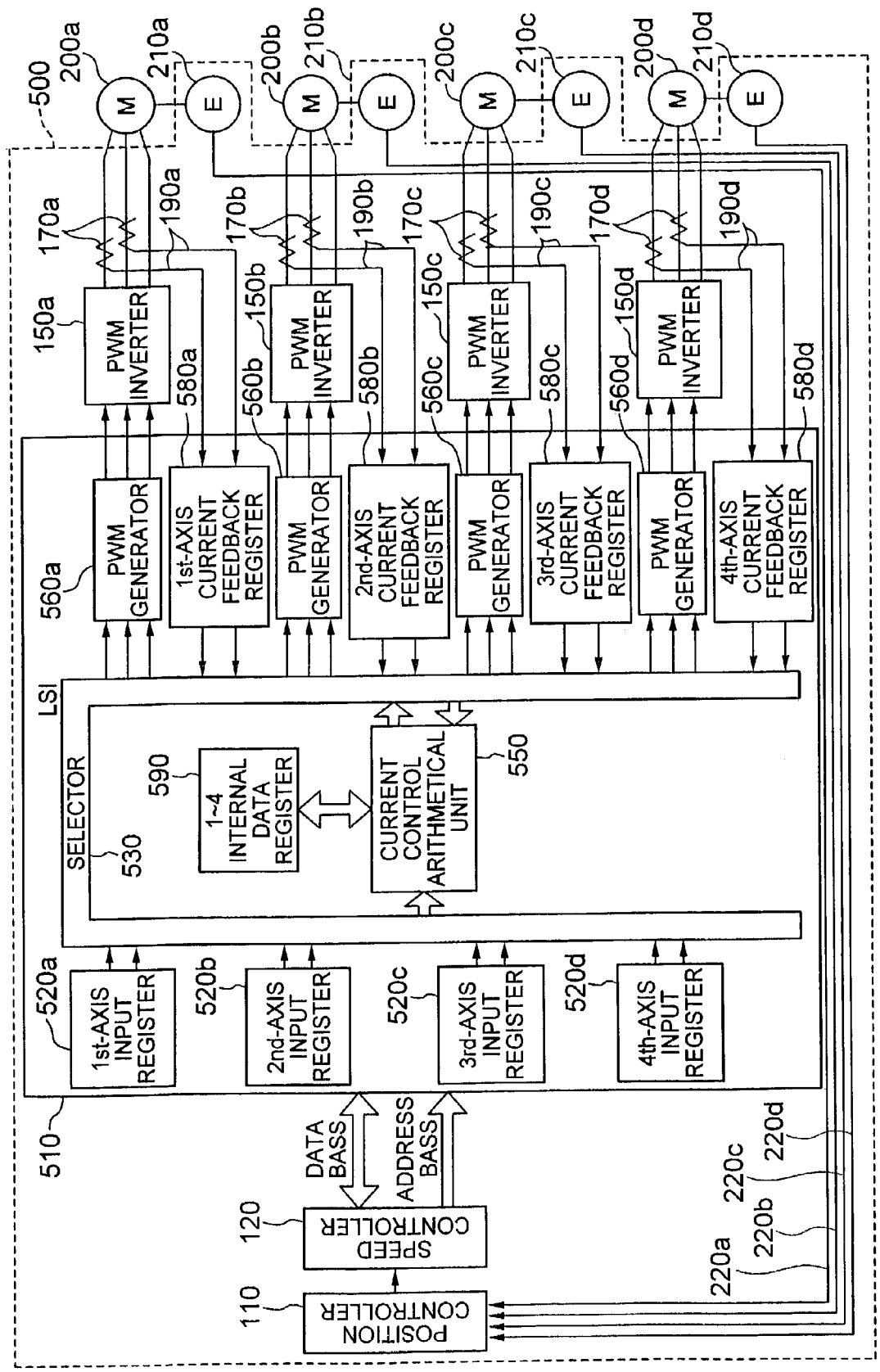
FIG. 5 is a block diagram schematically showing a servo control device and servo motors according to an embodiment of the invention.

FIG. 5 is a block diagram schematically showing a servo control device 500 and servo motors 200a, 200b, 200c and 200d (hereinafter simply called servo motor(s) 200 as well) according to an embodiment of the invention.

Each servo motor 200 functions as a driver for driving a target to be controlled (not shown). The target to be controlled may be a feed driving mechanism such as a linear motor, rack pinion, static-pressure worm rack or static-pressure screw. In case a linear motor is employed as a feed driving mechanism, the linear motor functions as a driver as well, and the linear motor can be employed instead of the servo motor 200. As an embodiment of the target to be controlled, a rotation driving mechanism such as a belt driving mechanism may be employed.

The servo control device 500 supplies a drive current for driving and controlling a servo motor 200. The servo control device 500 includes PWM (pulse width modulator) inverters 150a, 150b, 150c and 150d (hereinafter simply called PWM inverter(s) 150 as well) each for supplying a drive current to an associated servo motor 200, and current detectors 170a, 170b, 170c and 170d (hereinafter simply called current detector(s) 170 as well) each for detecting the drive current value.

The servo control device 500 further includes a logical arithmetic section 510 that receives a current command determining a drive current for controlling the drive speed of each servo motor 200 to move a target to be controlled to a predetermined position, introduces a drive current value fed back via any one of feedback circuits 190a, 190b, 190c and 190d (hereinafter simply called feedback circuit(s) 190 as well) from the associated current detector 170, then corrects the current command in accordance with the drive current value by a digital logic process, and outputs the current command after the correction to the associated PWM inverter 150.

The servo control device 500 further includes a position controller 110 for outputting a speed command based on a positional difference of the target to be controlled, and a speed controller 120 for converting the speed command introduced from the position controller 110 to a current command and outputting the current command to the logical arithmetic section 510.

The servo control device 500 further includes position detectors 210a, 210b, 210c and 210d (hereinafter simply called position detector(s) 210 as well) each for detecting the position of the associated servo motor 200, and position feedback circuits 220a, 220b, 220c and 220d (hereinafter simply called position feedback circuit(s) 220 as well) each for returning the position of the associated servo motor 200 detected at the position detector 210 to the position controller 110.

The logical arithmetic section 510 includes input registers 520a, 520b, 520c and 520d (hereinafter simply called input register(s) 520 as well) each for introducing and holding a current command to the associated servo motor 200; current feedback registers 580a, 580b, 580c and 580d (hereinafter simply called current FB register(s) 580 as well) each for introducing and holding a drive current value of the associated servo motor 200 fed back from the current detector 170; and a current control arithmetical unit 550 for correcting the current command from any of the input registers 520 to equalize it to the drive current value from the associated current FB register 580.

The current control arithmetical unit 550 is connected for communication with the input registers 520 and the current FB registers 580 via a selector 530. The current control arithmetical unit 550 is also connected for communication with PWM generators 560a, 560b, 560c and 560d (hereinafter simply called PWM generator(s) 560 as well) via the selector 530. Each PWM generator 560 is configured to modulate a signal from the current control arithmetical unit 550 to a pulse width modulated signal by a pulse width modulating process and to output the modified signal to the associated PWM inverter 150.

The PWM inverters 150, input registers 520, current FB registers 580 and PWM generators 560 are associated with the respective servo motor 200, and they are equal in number to the servo motors 200. On the other hand, only one current control arithmetical unit 550 is provided in common use to a plurality of the servo motors 200. In this embodiment, one current control arithmetical unit 550 is commonly used for four servo motors 200.

The current control arithmetical unit 550 is connected for communication with an internal data register 590 as well. The current control arithmetical unit 550 sometimes needs an internal storage element such as an integrator, and the internal data register 590 is provided for this purpose.

According to the instant embodiment, the logical arithmetic section 510 is realized as a digital logic circuit in form of LSI (large-scale integration) made by incorporating the elements of the logical arithmetic section 510 in a single chip.

Next explained are behaviors of the servo control device 500 and the servo motors 200 according to the instant embodiment of the invention.

In receipt of the position of a target to be controlled from a position detector 210, the position controller 110 outputs a speed command determined from the difference between the position feedback and the position command to control the target of the control to an intended position. Additionally, the position controller 110 calculates the electrical angle of the servo motor 200 from the position feedback sent from the position detector 210, and outputs it.

The speed controller 120 calculates a speed feedback of the target of the control by time differentiation of the position feedback value introduced from the position controller 110, and outputs a current command determined from the difference between the speed feedback and the speed command from the position controller 110 to control the speed of the target of the control to an intended value. The current command is data on the drive current supplied to one of the servo motors 200a through 200d. Therefore, the speed controller 120 additionally outputs address data indicating to which of the servo motors 20a through 200d the current command is directed. Furthermore, the speed controller 120 outputs information on the electrical angle of the servo motor 200 in addition to the current command.

The logical arithmetic section 510 receives the information on the current command and the electrical angle and stored in a register region predetermined for the address data. For example, the input register in the logical arithmetic section 510 is regarded to include four regions, and these register regions are individually assigned to the axes of the servo motors 200. In the instant embodiment, information on the current command and the electrical angle of the servo motor 200a is held in the first-axis input register 520a; information on those of the servo motor 200b is held in the second-axis input register 520b; information on those of the servo motor 200c is held in the third-axis input register 520c; and information on those of the servo motor 200d is held in the fourth-axis input register 520d.

Data on current commands and electrical angles are parallel data from the first-axis one to the fourth-axis one in the input registers 520. The selector 530 converts the parallel data to serial data and transmits them to the current control arithmetical unit 550 in time division.

On the other hand, each current detector 170 detects a drive current value supplied from the PWM inverter 150 to the servo motor 200. The drive current value detected by the current detector 170 is fed back to the logical arithmetic unit 510 by the feedback circuit 190. Simultaneously, the drive current value is held in the corresponding register region. For example, the current FB register 580s in the logical arithmetic unit 510 are regarded to have four regions, and these register regions are assigned to the axes of the respective servo motors 200. In this embodiment, data on the drive current value of the servo motor 200a is held in the first-axis current FB register 580a; data on the drive current value of the servo motor 200b in the second-axis current FB register 580b; data on the drive current value of the servo motor 200c in the third-axis current FB register 580c; and data on the drive current value of the servo motor 200d in the fourth-axis current FB register 580d.

Data on the drive current values are parallel data from the first-axis one and the fourth-axis one in the current FB registers 580. The selector 530 converts the parallel data to serial data and transmits them to the current control arithmetical unit 550 in time division.

The current control arithmetical unit 550 compares the current commands from the input registers 520 with the drive current values from the current FB registers 580 and carries out arithmetical operation thereof. In this case, since the current commands and the drive current commands are time-divisional serial data, respectively, the current control arithmetical unit 550 proceeds arithmetical operations in time division in accordance with the respective serial data of the current commands and the drive current values. Similarly, the current control arithmetical unit 550 may carry out arithmetical operations of current commands corrected by electrical angles from the input registers 520.

Figure 6:
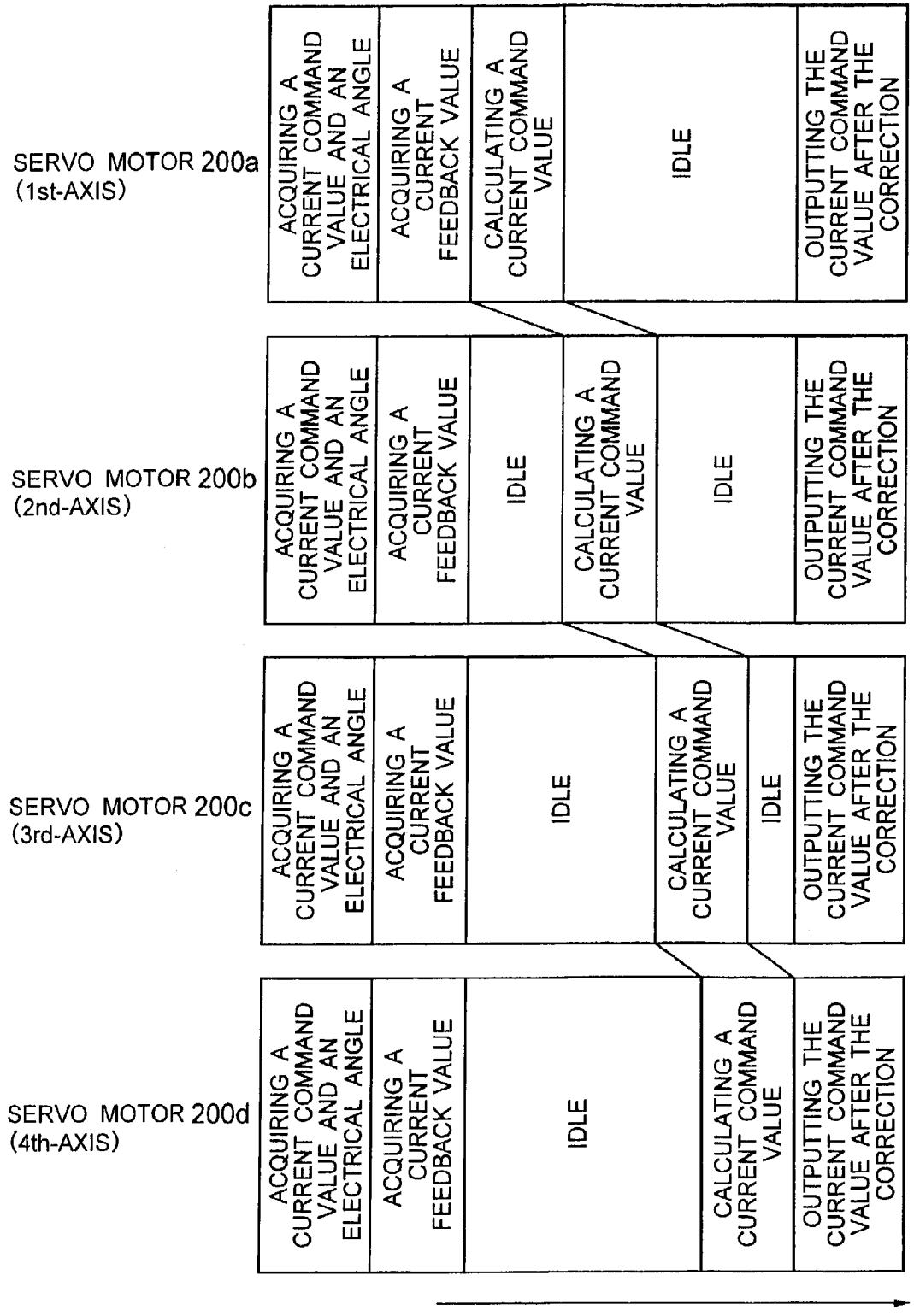
FIG. 6 is a timing chart showing behaviors of a logical arithmetic section 51.
Figure 7:
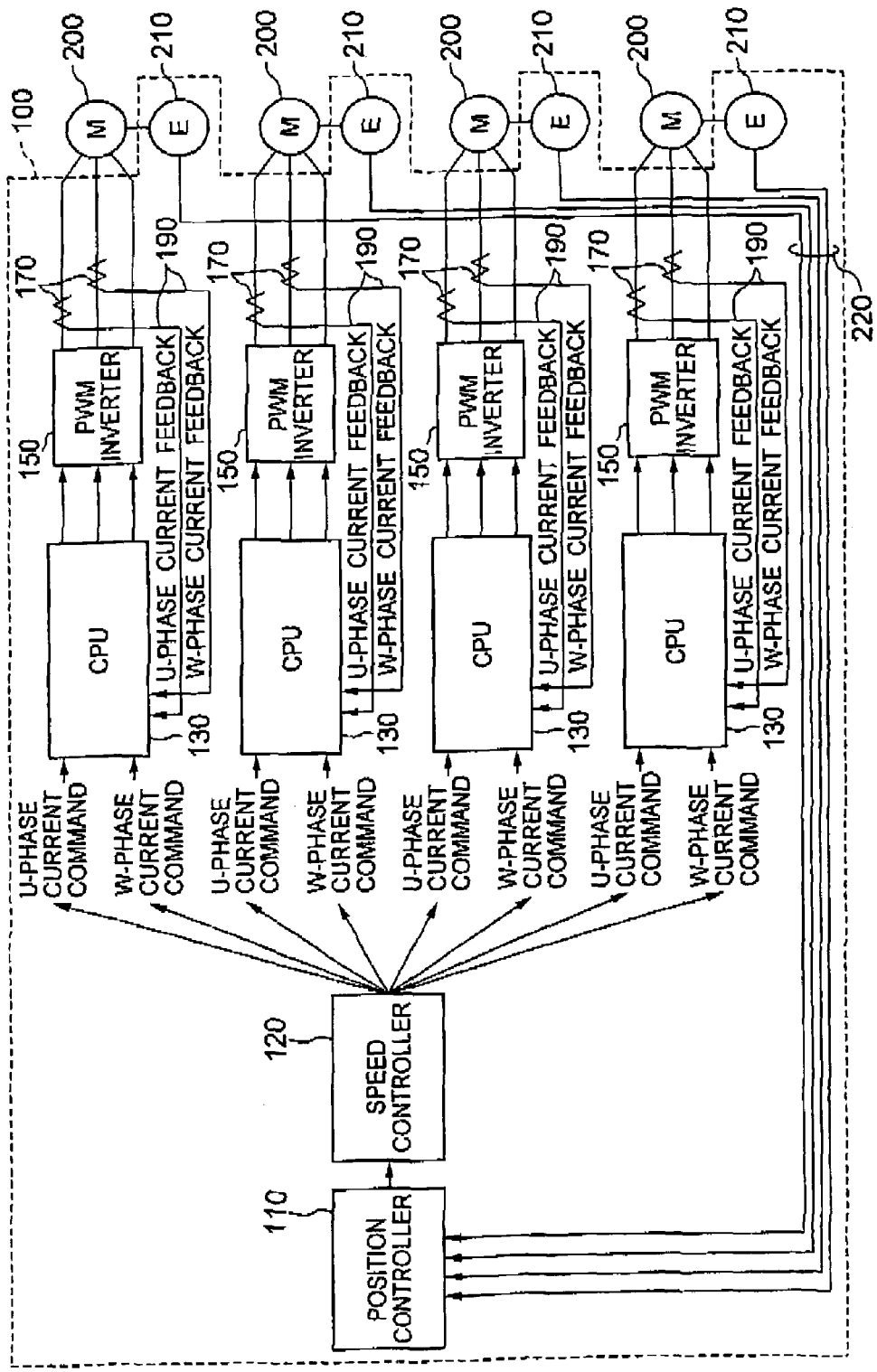
FIG. 7 is a block diagram schematically showing a conventional servo control device and servo motors.

FIG. 6 is a timing chart showing behaviors of a logical operation section 510. Here are shown processings of the servo motors 200a through 200d of the first to fourth axes sequentially on the time basis.

First, the input registers 520 acquire and hold current commands and electrical angles. Then the current FB registers 580 acquire and hold current feedback values. The current feedback values are information containing drive current values detected by the current detectors 170.

After that, the selector 530 converts the current commands, electrical angles and current feedback values to serial data and transmits them to the current control arithmetical unit 550 in time division. Since the current control arithmetical unit 550 is in charge of arithmetical operations for four servo motors 200, it proceeds the arithmetical operations for individual servo motors 200 in time division. In the instant embodiment, the current control arithmetical unit 550 starts current control arithmetic operation from that for the first-axis servo motor 200a and continues arithmetic operations sequentially for the second-axis servo motor 200b, third-axis servo motor 200c and fourth-axis servo motor 200d.

The current control arithmetic unit 550 operations calculate current commands corrected on the basis of electrical angles to supply intended current values to the servo motors with reference to differences between drive current values and current commands.

After that, the current control arithmetical unit 550 sends the corrected current commands to the selector 530, and the selector 530 converts the corrected commands into parallel data and outputs them to the PWM generators 560. Based on the corrected current commands, the PWM generators 560 outputs PWM signals to the PWM inverters 150. This is the outline of the functions of the logical arithmetic section 510.

Further, the PWM inverters 150 convert the PWM signals to current values pursuant to the current. With these currents, the servo motors 200 are driven and move the targets to be controlled to desired positions at desired speeds and torques.

According to the embodiment explained above, the current control arithmetical unit 550 is of a digital logic type. That is, the current control arithmetical unit 550 is digitally logicized by hardware without the use of a program.

Since the control functions of the digital logic system are composed of the logical circuits contained in the control circuit, it is efficient for carrying out predetermined repetitive control operations at a high speed, although it is inferior in availability for high-grade functions and multiple purposes.

On the other hand, in case of the conventional program-relied control system, functions of a device can be extended by merely changing the program to be available for multiple purposes of use. However, its control operation includes reading and interpretation of a plurality of orders in the program, and this invites the drawback of slowing the control speed.

Many machine tools robots, injection molding machines, wire discharge processing machines, electrically driven press machines and other various industrial machines use servo motors, and their current control arithmetical units can be designed according to a single algorithm. Even when the CPU 130 and the current control arithmetical unit 550 operate with the same clock frequency, the servo control device by the digital logic system can speed up the control period several tens of times faster than the control period of the program-relied control system.

Since the digital logic system raises the rate of the control period to several tens of times faster than the control period by the program-relied control system, a plurality of servo motors can be controlled with a single LSI chip. For example, in this embodiment, the logical arithmetic section 510 having the single current control arithmetical unit 550 controls four servo motors 200. Even when a plurality of axes are controlled with a single LSI chip like the instant embodiment, the control period of the servo control device 500 of this embodiment is faster than the control period of the conventional servo control device by several tens to four times. In addition, current control LSIs the servo control device 500 needs can be reduced accordingly, and the cost of the servo control device 500 is reduced a lot.

If a still faster control period of the servo control device 500 is desired, the number of servo motors 200 to be controlled by a single current control arithmetical unit 550 may be reduced, or an LSI chip with higher processing capability may be used. For example, in case one current control arithmetical unit 550 is provided for each servo motor 200 (not shown), a control period faster than the conventional servo control device 100 by several tens of times can be obtained.

However, if one current control arithmetical unit 550 is provided in association with each servo motor 200 or a high-performance current control arithmetical unit 550 used, the cost of the servo control device increases. Therefore, the speed of the control period and the cost of the servo control device are in a trade-off relation, and the control device may be designed to attach more importance to any of these factors depending upon the purpose of its use. For example, it is possible to reduce the cost of the servo control device more than the conventional servo control device while maintaining the speed of the control period at the same level by reducing LSIs used in the servo control device, or by using the same number LSI chips inexpensive and lower in processing capability than those used in the conventional device.

Although the invention has been explained by way of some embodiments, the invention is not limited to the description of these embodiments, but rather contemplates other various changes and modifications. It will be appreciated from the following recitation of claims that such changes and modifications can be embraced within the technical scope of the invention.

The servo control device according to any of the embodiments of the invention is low in manufacturing cost, compact, and faster in control period of the target to be controlled than existing devices, and can therefore attain both an improvement of the control capability and reduction of the cost.

What is claimed is:

1. A servo control device, comprising:
   a current supply unit for supplying a drive unit with a drive current for driving a target to be controlled;
   a first detector for detecting at least the drive current value; and
   a logical arithmetic section which introduces a current command determining the drive current for controlling the drive speed of the drive unit to move the target to be controlled to a predetermined position, and which introduces the drive current value fed back from the first detector, said logical arithmetic section outputting the current command to the current supply unit alter converting the current command by a digital logic process on the basis of the drive current value by using a custom large-scale integrated circuit, wherein the logical arithmetic unit includes:
   an input register which introduces and holds the current command;
   a feedback register which introduces and holds the drive current fed back from the first detector; and
   a current control arithmetical unit for correcting the current command with reference to a difference between the current command from the input register and the drive current value from the feedback register.

2. The servo control device according to claim 1 wherein the current supply unit is an inverter circuit controlled by a pulse width modulation signal,
   wherein the logical arithmetic section further includes a pulse wave generator connected between the inverter circuit and the current control arithmetical unit, said pulse wave generator modulating a signal from the current control arithmetical unit to a pulse width modulation signal by a pulse width modulation process and outputting the modulated signal to the inverter circuit.

3. The servo control device according to claim 1 wherein the input register, the feedback register and the current control arithmetical unit are incorporated in a single chip.

4. A servo control device, comprising:
   a current supply unit for supplying a drive unit with a drive current for driving a target to be controlled;
   a first detector for detecting at least the drive current value; and
   a logical arithmetic section which introduces a current command determining the drive current for controlling the drive speed of the drive unit to move the target to be controlled to a predetermined position, and which introduces the drive current value fed back from the first detector, said logical arithmetic section outputting the current command to the current supply unit after converting the current command by a digital logic process on the basis of the drive current value by using a custom large-scale integrated circuit, wherein the drive unit is a plurality of servo motors,
   wherein the current supply unit and the first detector are equal in number to the number of the servo motors, wherein the logical arithmetic section includes:
input registers each associated with one of the servo motors to introduce and hold the drive current value fed back from the first detector;
feedback registers each associated with one of the servo motors to introduce and hold the drive current value fed back front the first detector; and a current control arithmetic unit for correcting the current commands in time division with reference to differences between the current commands from the input registers and the drive current values from the feedback registers.

* * * * *